United States Patent [19]

Gresley et al.

[11] Patent Number: 4,540,962
[45] Date of Patent: Sep. 10, 1985

[54] SOLENOID COIL WIRE TERMINATION

[75] Inventors: Ross A. Gresley; Howard E. Leech, both of Anderson; Alan L. Smock, Dubois, all of Ind.

[73] Assignee: General Motors Corporation, Detroit, Mich.

[21] Appl. No.: 614,753

[22] Filed: May 29, 1984

[51] Int. Cl.³ .......................................... H01H 51/08
[52] U.S. Cl. .................................... 335/131; 335/255
[58] Field of Search ............... 335/131, 126, 255, 202

[56] References Cited

U.S. PATENT DOCUMENTS

| | | | |
|---|---|---|---|
| 1,702,158 | 2/1929 | Gagnon | 339/220 |
| 2,020,752 | 12/1935 | Wiley et al. | 29/155.5 |
| 2,066,876 | 1/1937 | Carpenter et al. | 250/16 |
| 2,382,996 | 8/1945 | Jacobi | 200/163 |
| 2,456,118 | 12/1948 | Foster | 174/153 |
| 2,539,547 | 1/1951 | Mossman et al. | 335/131 |
| 2,658,130 | 11/1953 | Bondurant | 200/163 |
| 2,856,674 | 10/1958 | Hill | 29/155.5 |
| 2,975,340 | 3/1961 | Jencks et al. | 335/260 |
| 3,065,524 | 11/1962 | Donnell et al. | 29/155.5 |
| 3,088,191 | 5/1963 | Breiling | 29/155.5 |
| 3,134,867 | 5/1964 | Winship | 335/154 |
| 3,200,220 | 8/1965 | Carr et al. | 335/131 |
| 3,209,066 | 9/1965 | Toomey et al. | 174/68.5 |
| 3,271,604 | 9/1966 | Priddy | 310/234 |
| 3,564,709 | 2/1971 | Hickton | 29/629 |
| 3,571,770 | 3/1971 | Dew | 335/255 |
| 3,605,079 | 9/1971 | Schneider | 339/276 |
| 3,611,218 | 10/1971 | Fujita | 335/202 |
| 4,080,541 | 3/1978 | Mazzorana | 310/89 |
| 4,156,220 | 5/1979 | Mazzorana | 335/262 |
| 4,228,415 | 10/1980 | Schantz | 335/255 |

*Primary Examiner*—Harold Broome
*Attorney, Agent, or Firm*—C. R. Meland

[57] ABSTRACT

A starter solenoid for electric starting apparatus and its method of manufacture. The solenoid has hold-in and pull-in coils and a cap formed of insulating material that carries a start switch terminal and a motor terminal. Both terminals have axially extending internal bores and when the cap is moved into engagement with the case of the solenoid to secure it thereto end lead wires of the coils are inserted into the bores of the terminals. The terminals are radially crimped into engagement with the wires and the crimped portions are then welded to the wires. The ground connnection for one end of the hold-in coil is made by inserting an end lead wire of the hold-in coil into the bore of a hollow metallic terminal that is carried by a metallic plate member, crimping the terminal to the wire and then welding the crimped portion to the wire.

5 Claims, 12 Drawing Figures

SOLENOID COIL WIRE TERMINATION

This invention relates to solenoid operated switches and more particularly to the electrical connections or terminations that are utilized to connect the lead wires of the solenoid coils to electrical terminals.

Electric engine cranking motors or starters that utilize a shift lever to move a starter pinion into mesh with the ring gear of an engine include a solenoid operated switch that controls energization of the cranking motor. The plunger of the solenoid operates the switch and is also mechanically connected to the shift lever which shifts the pinion into and out of mesh with the ring gear.

Solenoids of the type described have a pull-in coil and a hold-in coil located within a case. A cover formed of insulating material is secured to one end of the case and it carries a motor terminal, a start switch terminal and a battery terminal. One end of the pull-in coil and one end of the hold-in coil are connected to the start switch terminal. The other end of the pull-in coil is connected to the motor terminal and the other end of the hold-in coil is grounded. Thus, in the solenoid of the type described four electrical connections must be made to the terminations or end lead wires of the two coil windings.

The present invention is concerned with providing new and improved electrical connections to the ends of the two coil windings of the solenoid. It is accordingly one of the objects of this invention to provide electrical connections of the type described that can be made after the cover that carries the terminals is secured to the case that supports the coil windings. This is accomplished by providing a motor terminal and a start switch terminal which are both hollow, that is they have a bore extending entirely therethrough. The case of the solenoid carries the coil windings and it is arranged such that the ends of the pull-in coil and one end of the hold-in coil extend axially thereof. The other end of the hold-in coil in this assembly is connected to ground. The cover, with its hollow terminals, is then assembled to the case such that the axially extending ends of the coil windings are threaded through the bores of the terminals. After the cover is attached to the case the terminals are crimped against the wires and the ends of the terminals and wires are then welded by a tungsten inert gas welding operation in order to weld the wires to the respective terminals. The welding operation melts the material of both the end of the wire and the end of a respective terminal and provides a weld nugget at the end of the terminal which completely seals the terminal, that is no water or moisture can pass to the interior of the terminal.

The above-described arrangement has a number of advantages. First of all, it simplifies the manufacture of the solenoid since it eliminates the need for making internal electrical connections between the ends of the coil windings and the terminals prior to the time that the cover is secured to the case. In addition, the electrical connecting arrangement of this invention does not rely on the use of cooperating male and female terminals, for example of the type where the end of a coil winding is connected to a female terminal that receives a male terminal that is fixed to one of the terminals carried by the cap. Thus, both the ease of manufacture and the reliability of the electrical connection for the coil windings is improved.

Another object of this invention is to provide an improved ground connection for the hold-in winding of a solenoid of the type that has been described. In carrying this object forward the metallic plunger stop of the solenoid carries a hollow metallic electrical terminal that receives one end lead of the hold-in coil. This terminal is then crimped against the end of the lead and is subsequently welded thereto by a tungsten inert gas welding operation. This ground connection is made prior to the time that the cover member is secured to the case member and prior to the time that the terminals of the cover member are crimped and welded to the end lead wires of the solenoid coils.

Still another object of this invention is to provide an improved method of manufacturing solenoids having electrical connections of the type described.

IN THE DRAWINGS

Figure 1:
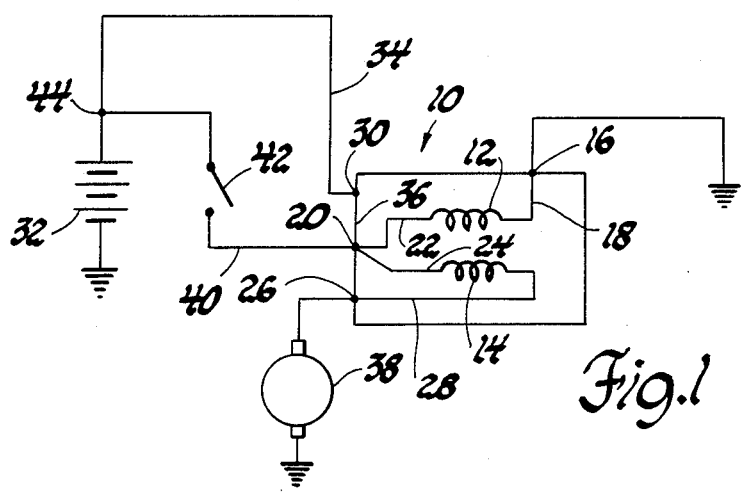
FIG. 1 is a schematic circuit diagram of the electrical connections to the solenoid of an electric cranking motor.

Referring now to the drawings and more particularly to FIG. 1, the reference numeral 10 designates a solenoid for an electric cranking motor that is of a type that is operative to close a circuit to an electric cranking motor and also to shift the pinion into mesh with the ring gear of an engine. The solenoid 10 has a hold-in winding 12 and a pull-in winding 14. One end of the hold-in winding 12 is connected to a terminal 16 by a conductor 18. The terminal 16 is grounded as illustrated. The other end of the hold-in coil 12 is connected to a start switch terminal 20 by a conductor 22. The terminal 20 is also connected to one side of the pull-in winding 14 by a conductor 24. The opposite end of the pull-in winding 14 is connected to a terminal 26 via a conductor 28. The solenoid 10 further has a battery terminal 30 which is connected to one side of a vehicle battery 32 by a battery cable 34.

The terminals 20, 26 and 30 are all supported by an end cap designated by reference numeral 46 that is formed of insulating material. The present invention provides an improved connection between conductor 18 and terminal 16, between conductors 22 and 24 and terminal 20 and between conductor 28 and terminal 26. As will be more fully described hereinafter the terminals 16, 20 and 26 are hollow terminals that receive the end conductors of the solenoid coils. The ends of these hollow terminals are crimped against the winding ends and thereafter the conductors are welded to the terminals by a tungsten inert gas welding operation.

In FIG. 1 the terminals 26 and 30 also form electrical switch contacts which are adapted to be bridged by a contact disk in a manner to be more fully described hereinfter. The terminal 26 is connected to one side of an electric cranking motor 38, the opposite side of which is grounded. Accordingly, when the contact disk engages terminals 30 and 26 the cranking motor 38 will be energized.

The start switch terminal 20 is connected to a conductor 40 which in turn is connected to one side of a start switch 42. The opposite side of the start switch is connected to the positive side of battery 32 at junction 44. When the start switch 42 is closed the hold-in coil 12 is energized via terminal 20 and grounded terminal 16. The pull-in coil is also energized via a circuit that includes conductor 40, terminal 20, pull-in coil 14, terminal 26 and then through the electric cranking motor 38 to ground. When the hold-in and pull-in coils are energized a plunger (not illustrated) causes a contact disk to connect terminals 30 and 26 and also operates a shift lever (not illustrated) to shift the pinion of the cranking apparatus into mesh with the ring gear of an engine.

Figure 2:
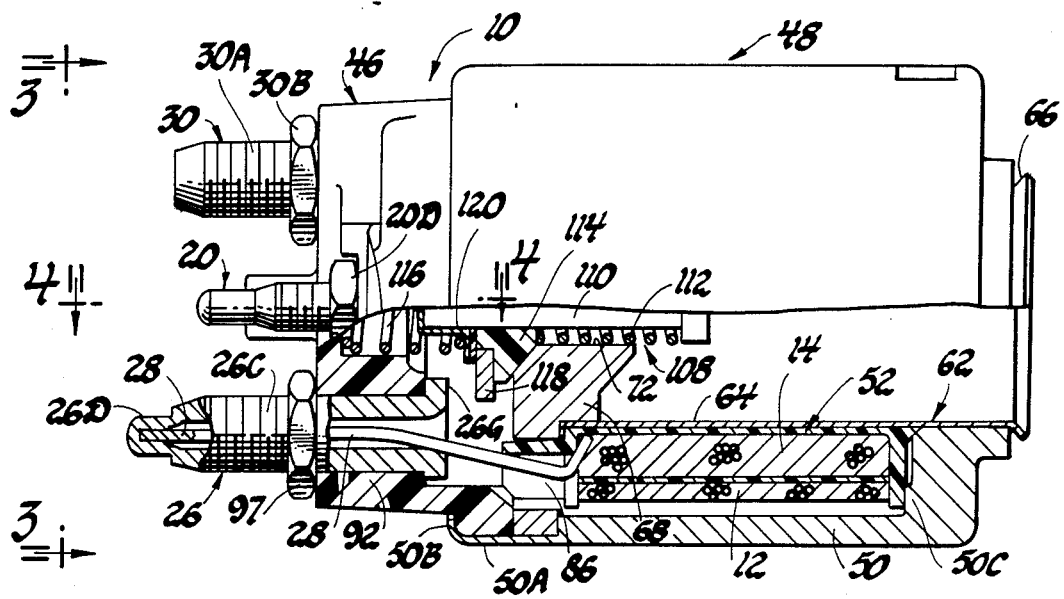
FIG. 2 is a view partly in section illustrating a solenoid made in accordance with this invention.

The physical construction of the solenoid identified by reference numeral 10 is illustrated in FIG. 2. In FIG. 2 the same reference numerals have been utilized as were utilized in FIG. 1 in order to identify certain corresponding parts.

Figure 7:
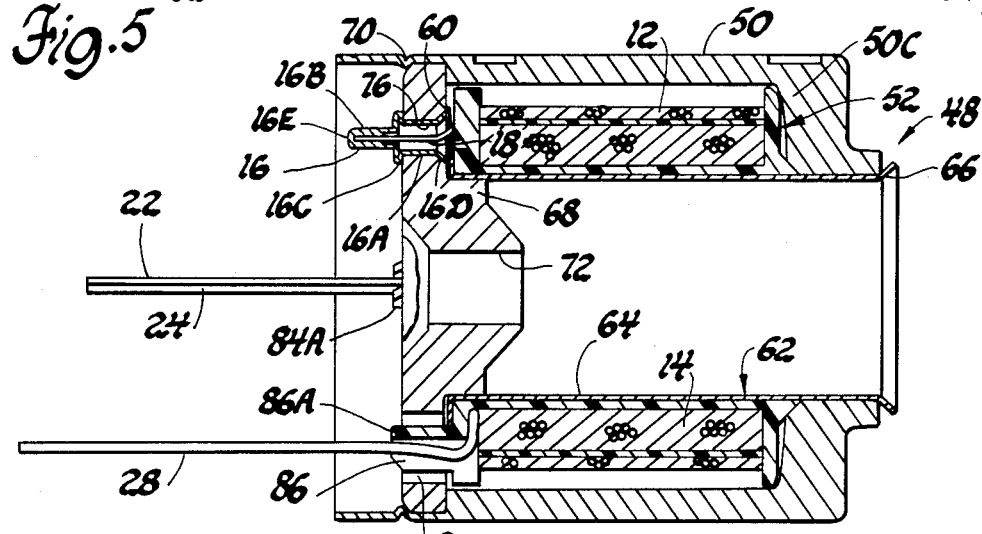
FIG. 7 is a sectional view of a case and coil assembly that forms a part of the solenoid illustrated in FIG. 2.

The solenoid 10 comprises a cover assembly generally designated by reference numeral 46 and a case and coil assembly generally designated by reference numeral 48. The case and coil assembly 48 is illustrated in FIG. 7 and it has an annular metal case designated by reference numeral 50. One end portion 50A of the case 50 is of thinner cross section than the remainder of the case and an end portion 50B of end portion 50A is formed over a portion of the cover assembly as shown in FIG. 2. This serves to secure the case assembly 48 to the cover assembly 46.

The case assembly 48 contains a coil winding support or spool that is formed of insulating material and which is generally designated by reference numeral 52. This coil support is illustrated in detail in FIGS. 8 and 9 and comprises a tubular portion 54 having axially extending slots 54A and a pair of flanges 56 and 58. The winding area defined by the flanges 56 and 58 and the outer wall of the tubular portion 54 contain the pull-in winding 14 and the hold-in winding 12 both of which are formed of insulated copper wire. The spool 52 is axially compressed against an internal surface of end wall 50C of case 50 by a plurality of circumferentially spaced spring fingers 60 which are part of a metallic plunger support or tube generally designated by reference numeral 62. The tube 62 is formed of a nonmagnetic material such as stainless steel and is assembled to spool 52 prior to the time that coils 12 and 14 are wound on the spool. The tubular portion 64 of tube 62 tightly fits the tubular portion 54 of the spool 52 and has a flared portion 66 which is formed over an end of the case 50 after the coil winding assembly is inserted into case 50.

The case assembly 48 further includes a plunger stop designated by reference numeral 68 which is formed of a metallic magnetic material such as a sintered compacted iron powder. The stop member 68 is secured to the case 50 by staking portions of the case 50 at circumferentially spaced areas designated by reference numeral 70 and an inner wall of member 68 engages spring fingers 60. The stop member 68 has a bore 72 which is adapted to receive portions of a contact assembly. The end of the plunger stop 68 is engaged by the plunger (not illustrated) of the solenoid when coils 12 and 14 are energized to fully pull in the plunger. The part 68 also forms an end wall or plate that, with the case 50, defines a housing containing coils 12 and 14. The plunger slides in tubular portion 64 in a manner depicted in the United States patent to Colvin et al. U.S. Pat. No. 4,382,242.

The stop member 68 carries a metallic ground terminal designated by reference numeral 16 which is formed, for example, of steel material. The terminal, in its initial condition, is hollow or in other words has an axial bore open at each end thereof. The terminal 16 is comprised of tubular portions 16A and 16B and a folded portion 16C. The portion 16A has a larger diameter than portion 16B. When assembling the terminal 16 to part 68 portion 16A is inserted into the hole 76 formed in the stop member 68 such that portion 16C engages part 68. The end of portion 16A is then spun or rolled over to form flared portion 16D. This secures the terminal 16 to the metallic stop member 68. One end of conductor or end lead wire 18 of the hold-in coil 12 extends into the bore of terminal 16 as is depicted in FIG. 7. A certain length of portion 16B is crimped into engagement with the conductor 18 and following this crimping operation the end of the conductor 18 and the end of portion 16B of the terminal 16 are welded by a tungsten inert gas welding operation which will be described in detail hereinafter. The end 16E of terminal 16, in its final welded form, generally takes the shape illustrated in FIG. 7 where the end of the conductor 18 and the end of terminal portion 16B have been heated to a molten condition to thereby completely seal off the end of terminal 16 and to also provide an electrical connection between the terminal 16 and the conductor 18.

It will be appreciated by those skilled in the art that the metallic housing 50 is at ground potential when utilized on a motor vehicle and accordingly the conductor 18 is connected to ground via terminal 16, metallic stop assembly 68 and housing 50. This ground connection is illustrated in the schematic circuit diagram of FIG. 1.

The conductor 18, which is the terminating conductor or end lead wire of one side of the hold-in coil 12, extends through a slot 82 (FIG. 8) formed in the flange 56 of the coil support 52. This conductor also passes between a pair of the circumferentially spaced spring fingers 60. When the hold-in coil 12 has been wound on the coil support the conductor 18 is placed in the slot 82. Portions of the material of the spool defining the slot 82 are then ultrasonically welded together to close the open end of the slot to thereby retain conductor 18 in a desired position.

Figure 8:
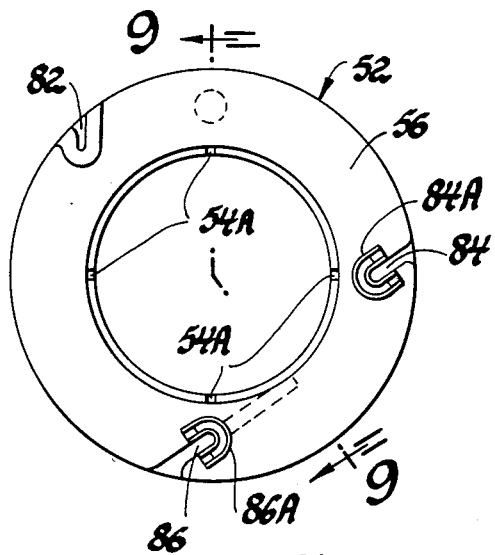
FIG. 8 is an end view of a coil winding support utilized in the solenoid of this invention.
Figure 9:
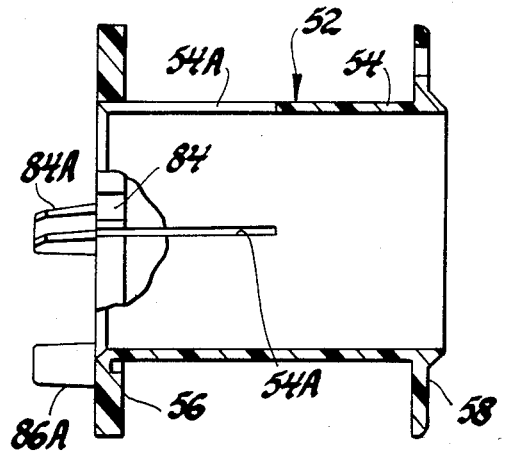
FIG. 9 is a sectional view taken along line 9—9 of FIG. 8.

The coil support 52, as illustrated in FIG. 8, has a pair of generally radially extending slots 84 and 86 formed in flange 56. One end of the slot 84 is bounded by an axially extending generally U-shaped or horseshoe shaped wire retaining rib 84A. In a similar fashion a U-shaped rib 86A is provided that bounds the slot 86. The conductor 28, which is the end conductor or termination of one side of the pull-in coil 14, extends through the slot 86 as is illustrated in FIGS. 2 and 7. The ends of the U-shaped rib 86A are ultrasonically welded together to retain the conductor 28. The conductors 22 and 24, which respectively form terminations or end conductors of hold-in coil 12 and pull-in coil 14, both extend through the slot 84 and through the axially extending rib 84A. The ends of the rib 84A are ultrasonically welded together in order to retain conductors 22 and 24.

In the assembly of the case and coil assembly 48, shown in FIG. 7, the hold-in and pull-in coils are wound on the spool 52 and then respective conductor ends of these coil windings are placed within the respective slots formed in the flange 56. The solenoid plunger tube 62 is assembled to the spool 52 prior to winding coils 12 and 14 thereon. When a winding assembly, comprised of parts 52, 62 and coil windings 12 and 14, is completed this coil winding assembly is inserted into the case 50. The plunger stop 68 is then assembled to the case 50 and during this assembly the wire 18 is in a proper position to extend through the tubular terminal 16. In this regard the internal diameter of the bores of portions 16A and 16B of terminal 16 are large enough to freely accommodate the wire 18. When the plunger stop is assembled to the housing 50 the U-shaped ribs 84A and 86A, together with their retained conductors, project through openings or bores 90 formed in the stop 68. When the plunger stop has been properly positioned the housing is staked at circumferentially spaced points designated by reference numeral 70 in order to fix the plunger stop 68 in the proper axial position. The portion 66 of the tube 62 is then crimped or rolled against the housing or case 50.

When this assembly is completed a certain axial length of the portion 16B of terminal 16 is crimped into tight engagement with a portion of the conductor 18 that has been stripped of insulation. This crimp can be, for example, a flat crimp. By way of example, about 75% of the axial length of terminal portion 16B, as measured from its open end, can be crimped to conductor end lead 18. After the crimping operation the end of terminal portion 16B is welded to the end of conductor 18 by a tungsten inert gas welding operation illustrated in FIG. 12. The conductor end lead 18 is of such a length that prior to crimping and welding to the end of portion 16B of terminal 16 the wire extends beyond the end of the portion 16B by, for example, 0.1 inch.

Figure 3:
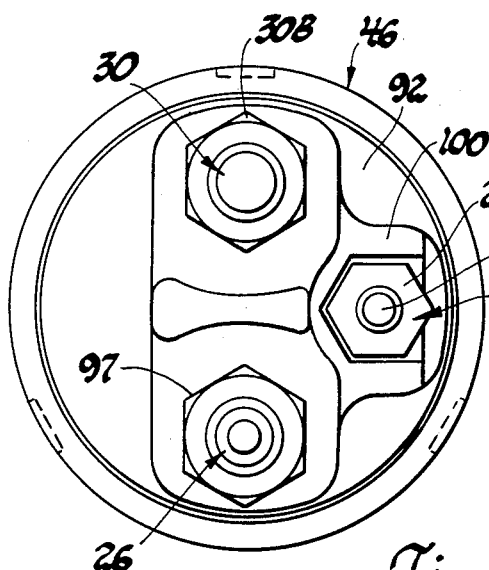
FIG. 3 is an end view of the solenoid illustrated in FIG. 2 looking in the direction of the arrows 3—3.
Figure 4:
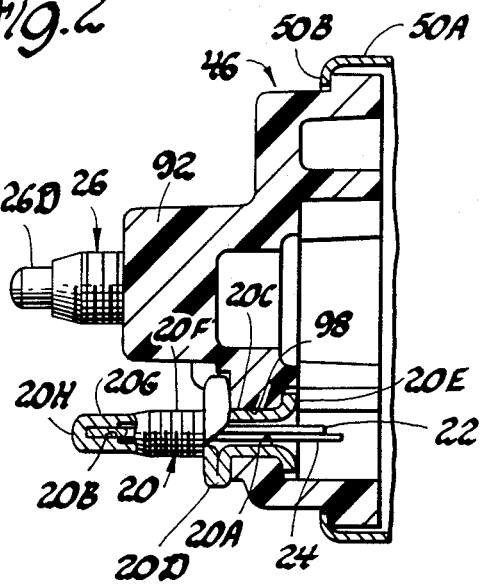
FIG. 4 is a sectional view taken along line 4—4 of FIG. 2.
Figure 5:
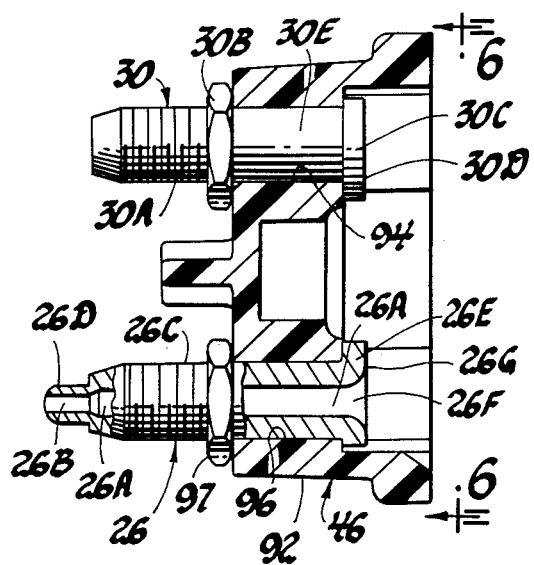
FIG. 5 is a sectional view of a cover assembly which forms a component part of the solenoid illustrated in FIG. 2.
Figure 6:
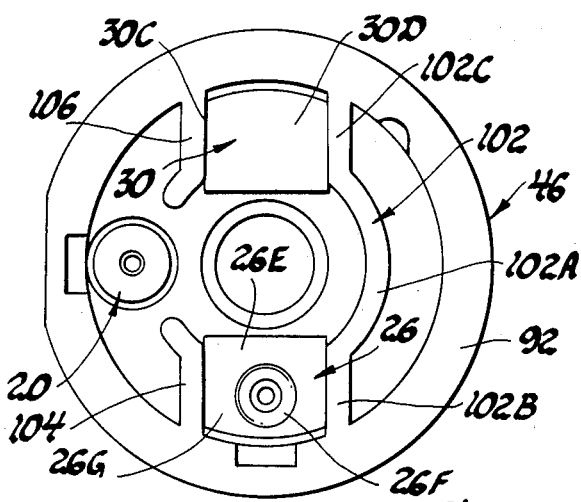
FIG. 6 is an end view of the cover assembly of the solenoid illustrated in FIG. 2 looking in the direction of arrows 6—6 of FIG. 5.

The cover assembly 46 is depicted in FIGS. 2, 3, 4, 5 and 6. In FIGS. 2-4 the cover assembly is shown with the projecting wires 22, 24 and 28 crimped and welded to the terminals carried by the cover member. FIGS. 5 and 6 illustrate the cover assembly prior to the crimping and connection of the conductors 22, 24 and 28 to the terminals of the cover assembly. The cover assembly 46 comprises a cover member 92 which is formed of a molded plastic insulating material. The cover member 92 carries a solid copper battery terminal 30 having a threaded portion 30A that cooperates with a nut 30B to fix this terminal to the cover member 92. This terminal has a head 30C provided with an electrical contact face 30D and has a portion 30E that extends through a hole 94 formed in the cover member 92. The cover member 92 also carries a copper motor terminal 26. The terminal 26 is hollow or has an axially extending bore extending entirely therethrough that is comprised of bores 26A and 26B. The bore 26A has a slightly larger diameter than bore 26B. The terminal 26 has an externally threaded portion 26C and a cylindrical portion 26D of smaller diameter than threaded portion 26C. The terminal 26 further has a head portion 26E provided with an outwardly flared opening 26F and contact face or surface 26G. The terminal 26 is formed of a copper material and extends through a hole 96. The terminal 26 is fixed to the cover 92 by a nut 97 which is threaded to the external threaded portion 26C of the terminal 26.

The cover 92 also supports a steel terminal member 20 as illustrated in FIG. 4. The terminal 20 has an internal bore comprised of bores 20A and 20B which receive the conductors 22 and 24. Bore 20A has a slightly larger diameter than bore 20B. The terminal portion 20C passes through a hole 98 and has a folded hexagonal portion 20D which engages an outer wall of the cover 92. The terminal 20 has a spun over portion 20E, an externally threaded portion 20F and a non-threaded circular end portion 20G. Prior to assembling the terminal 20 to the cover 92 the spun over portion is in the form of an axially straight portion which is inserted through the hole 98 and then spun over to form the portion 20E to secure the terminal 20 to the cover 92. In FIG. 4 the end 20H of terminal 20 is shown welded to the ends of conductors 22 and 24. The terminal portion 20G, when assembled to cap 92 and prior to being crimped and welded to conductors 22 and 24, has an open end like the open end of portion 26D of terminal 26, that is the terminal 20 has a bore extending entirely therethrough. After the conductors 22 and 24 are positioned within the bore of terminal 20 a certain length of portion 20G is crimped into tight engagement with conductors 22 and 24 and the end of portion 20G is then welded to raise the temperature of the terminal and the conductors to a molten condition by a tungsten inert gas welding operation. The hexagonal portion 20D of terminal 20 fits within a rib 100 to prevent rotation of the terminal 20 relative to the cover 92.

Referring now more particularly to FIG. 6, it is seen that the cap 92 has an axially extending rib 102 that has a semicircular portion 102A, and straight portions 102B and 102C. The cap 92 also has ribs 104 and 106. A pair of opposed edges of head portion 26E of terminal 26 fits between ribs 104 and 102B in order to prevent rotation of terminal 26. The contact face 26G is curved slightly in a lateral direction. The head 30C of the solid battery terminal 30 is defined by opposed straight portions that are located respectively adjacent the rib 106 and the rib 102C in order to prevent rotation of the terminal 30. This terminal face 30D is slightly curved in a lateral direction between rib 106 and rib 102C.

The solenoid illustrated in FIG. 2 has a contact assembly generally designated by reference numeral 108. This contact assembly comprises a rod 110 which is formed of insulating material, a spring 112, an insulator 114 that has a bore that receives the rod, a spring 116 and a fastener 120. The insulator 114 carries an annular washer-shaped metallic movable contact disk 118 portions of which engage contact faces 26G and 30D when a solenoid plunger, that has not been illustrated, engages the end of the rod 110 to thereby move the annular contact disk 118 into engagement with the fixed contact faces 26G and 30D. The contact assembly can take various forms other than the one illustrated in FIG. 2.

The method of assembling the solenoid illustrated in FIG. 2 will now be described. Assuming that the case and coil assembly 48 has been manufactured, as illustrated in FIG. 7, and further assuming that the cover assembly 46 has been manufactured and is available in the form shown in FIGS. 5 and 6, the contact assembly 108 is assembled to the coil and case assembly 48 by pushing the rod 110 and spring 112 through the bore 72 of plunger stop 68. With the contact assembly so positioned, the cover assembly 46 and the coil and case assembly 48 are brought together axially and during this operation the conductors 22 and 24 slide through the bore of the terminal 20 and the conductor 28 slides through the bore of the terminal 26. The length of conductors 22, 24 and 28 are such that they project slightly beyond the ends of the terminals 20 and 26 when the cover 92 abuts one face of the stop 68. With the assemblies 46 and 48 held together the portion 50B of the case is rolled over as shown in FIGS. 2 and 4 to thereby fasten the cover assembly 46 to the case assembly 48. The unit in this state of assembly is finalized with the exception of crimping and welding operations and the ends of conductors 22, 24 and 28 extend slightly beyond the ends of the terminals 20 and 26, for example by about 0.1 inch. The conductor ends have been stripped of insulation prior to being inserted in the bores of the terminals.

Figure 10:
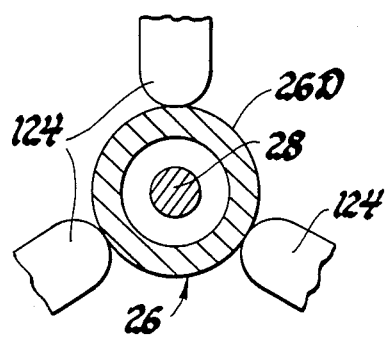
FIGS. 10 and 11 illustrate apparatus for crimping the terminals of the solenoid of this invention into engagement with internal wires.
Figure 11:
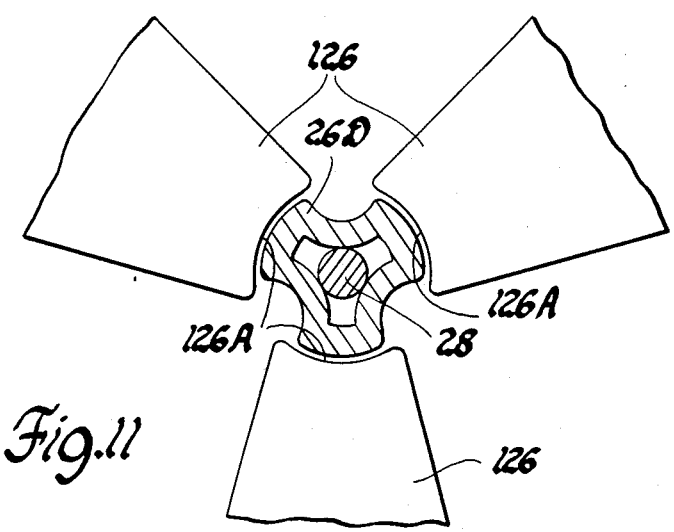
Figure 12:
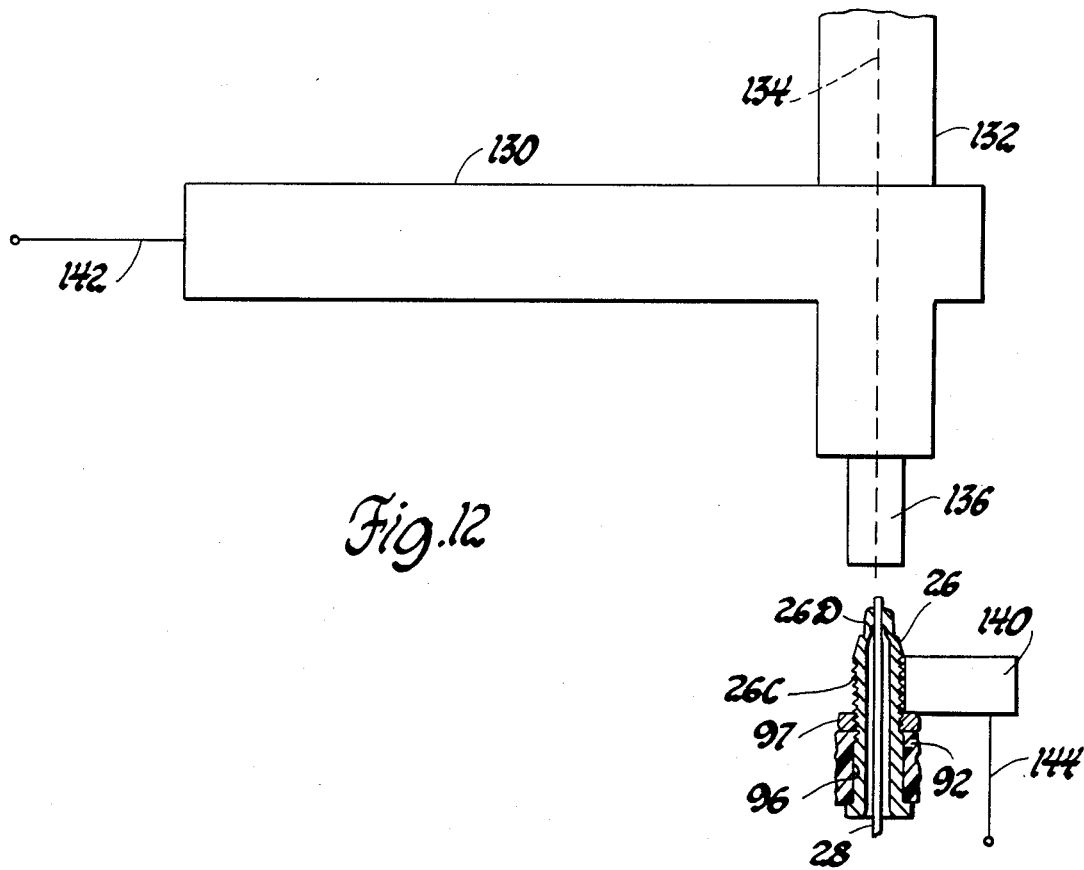
FIG. 12 is a schematic illustration of a tungsten inert gas welder which is utilized to weld the solenoid terminals to the conductors after they have been crimped as illustrated in FIGS. 10 and 11.

The method for crimping and welding the conductors or wires to the terminals is illustrated in FIGS. 10, 11 and 12 and will now be described in detail, first in regard to the crimping and welding of terminal 26 to end lead wire 28. In FIG. 10 a hollow terminal portion 26D of terminal 26 is illustrated with conductor 28 positioned therein. The conductor end 28, of course, is inserted into the bore of terminal 26 when cover assembly 46 is assembled to case assembly 48. A certain length of the portion 26D, for example about 75% of the length of portion 26D as measured from the open end of this terminal portion, is crimped inwardly by radially movable crimping tools 124 so that the portion 26D of the terminal is crimped to the shape illustrated in FIG. 11. During this crimping operation the material of portion 26D is forced toward the wire 28 and may actually engage the wire. With the portion 26D crimped to the shape illustrated in FIG. 11 this portion is subjected to another crimping operation provided by radially movable crimping tools 126 having curved crimping faces 126A that engage the already crimped portion 26D. In the final crimping operation, illustrated in FIG. 11, the material of portion 26D is forced into a generally cylindrical shape (circular crimp) with inner portions of the portion 26D being forced tightly against the conductor 28 to thereby crimp the portion 26D to the wire 28 and to thereby also provide a generally cylindrical surface for portion 26D as illustrated in FIG. 2. The axial length of the tools 124 and 126 of course correspond to the axial length of the portion 26D of the terminal 26 that is to be crimped which, as mentioned above, can be about 75% of the length of portion 26D. The length of the crimp must be short enough so that none of threaded portion 26C is crimped.

Once the terminal portion 26D has been crimped to conductor 28 the parts are subjected to a tungsten inert gas welding operation which is illustrated in FIG. 12. Since tungsten inert gas welding apparatus is well known it is only illustrated schematically in FIG. 12. In FIG. 12 the tungsten inert gas welding apparatus comprises a support 130 that supports an electrode holder 132 that carries a tungsten electrode designated by reference numeral 134 which is illustrated as a dotted line. The welding apparatus includes a ceramic gas nozzle 136, a grounding tool 140 and conductors 142 and 144 which are connected to a suitable source of electrical welding power. In FIG. 12 the terminal 26 is illustrated with a portion of the conductor 28 extending beyond the end of terminal portion 26D and with a length of portion 26D crimped to lead wire 28. The end of wire 28 may extend about 0.1 inch beyond the end of terminal portion 26D as has been previously described. The terminal 26 is located vertically as is the welding electrode 134. Thus, the solenoid 10 is positioned vertically during the welding operation so that both terminals 20 and 26 carried by cover 92 are vertically located. With the parts so positioned and welding power applied a torch arc exists between the end of tungsten electrode 134 and the top end of conductor 28 which is shielded by an inert gas, such as argon, emanating from nozzle 136. During the welding operation the temperature of the end of conductor 28 is raised to a value that melts it and subsequently the temperature of the end of terminal portion 26D is raised to a value to melt it. As a result the end of the wire 28 is bonded to the end of the terminal portion 26D. The welding operation produces a generally circular nugget at the end of terminal portion 26D that completely closes off this end of the terminal portion to thereby provide a waterproof seal for the end of the terminal. The final shape, after welding, is generally as illustrated in FIG. 2, that is the end of conductor 28 and the end of terminal portion 26D have been melted together to form a completely moisture-proof terminal. Thus, although about 75% of the length of terminal portion 26D is crimped to conductor 28 only the end of conductor 28 is welded to the end of terminal portion 26D leaving a length of the crimped portion that is not welded. The welding operation forms an electrical connection between the wire and the terminal and it also serves to seal off the end of the terminal.

The crimping of terminal portion 20G to wires 22 and 24 and the welding of the ends of these wires to the end of terminal portion 20G of the terminal 20 takes place in the same manner that has just been described with regard to the crimping and welding of conductor 28 to terminal 26. The length of crimp is about 75% of the length of terminal portion 20G and the ends of wires 22 and 24 are welded to the end of terminal portion 20G.

The welding of the end of conductor 18 to the end of terminal portion 16B of terminal 16 also takes place in the same manner that has been described above. However, the crimping of terminal portion 16B need not be circular crimp and does not need to be made in such a manner that subsequent welding will provide a nugget that provides a water proof seal for the end of the terminal since it is located within the interior of the solenoid. As previously mentioned, the crimp for terminal portion 16B can be a flat crimp.

In regard to the crimping operations, it will be appreciated by those skilled in the art that the crimping tools can take various configurations as long as the material of the terminal is tightly crimped against the wire. It is important, in regard to the crimping and welding operations applied to terminals 20 and 26, that this be accomplished in such a manner that the terminal end is completely sealed.

By way of example, and not be way of limitation, the copper wire of hold-in coil 12 may have a diameter of about 0.024 inch or about 0.61 mm. The internal diameter of the bores of terminal portions 16A and 16B may be respectively about 3 mm. and 1 mm. The copper wire of pull-in coil may have a diameter of about 0.048 inch or about 1.22 mm. Bores 26A and 26B of terminal 26 may have internal diameters respectively of about 3 mm. and 2 mm. Bores 20A and 20B of terminal 20 may have internal diameters respectively of about 4 mm. and 2 mm.

In summary, it is pointed out that the solenoid of this invention is subjected in use to a harsh environment since it is part of an electric starter that is mounted to the engine of a motor vehicle. As such it is subjected to vibration of the engine and to road splash. Accordingly, it is important that all electrical connections to the coils of the solenoid be able to withstand, among other things, vibration and road splash. In regard to vibration, the crimping of the terminals to the wires prevents vibration of the wire and the welding of the terminals to the wires assures good electrical and mechanical connection. Moreover, the welding of the start switch and motor terminals to the wires seals the ends of these terminals so that they are waterproof.

It is further pointed out that the electrical connections between the terminals and wires do not require any soldering operation which is difficult to perform on a mass production basis.

The embodiments of the invention in which an exclusive property or privilege is claimed are defined as follows:

1. A terminal and fixed electrical contact for a solenoid switch comprising, a housing formed of insulating material, a metallic terminal member supported by and extending through said housing, said terminal member having an internal axially extending bore, a solenoid coil winding comprising a terminating conductor located within said bore, said conductor being electrically connected to said terminal member at an end thereof that is located at one side of said housing, the opposite end of said terminal member being located at an opposite side of said housing and having a portion disposed at least partially around an end of said bore that forms a fixed electrical switch contact face that is adapted to be engaged by a movable electrical contact.

2. A terminal and fixed electrical contact for a solenoid switch comprising, a cover member formed of insulating material, a metallic terminal member supported by and extending through said cover member, said terminal member having an internal axially extending bore, a solenoid coil winding comprising a terminating conductor located within said bore, said terminal member having a crimped portion located at one end thereof that is located at one side of said housing, said crimped portion radially crimped into engagement with said conductor and welded thereto such that said one end portion of said terminal member is completely closed, the opposite end of said terminal member being located at an opposite side of said cover member and having a portion disposed at least partially around an end of said bore that forms a fixed electrical switch contact face that is adapted to be engaged by a movable electrical contact.

3. A terminal and fixed electrical contact for a solenoid switch comprising, an end cap formed of insulating material, a metallic terminal member supported by and extending through an opening formed in said end cap, said terminal member having an internal axially extending bore and an externally threaded portion located at one side of said end cap, a solenoid coil winding comprising a terminating conductor located within said bore, said conductor being electrically connected to said terminal member at an end thereof that is located at said one side of said end cap, the opposite end of said terminal member being located at an opposite side of said end cap and having a contact portion engaging said end cap and disposed at least partially around an open end of said bore that forms a fixed electrical switch contact that is adapted to be engaged by a movable electrical contact, and a nut threadingly engaging said threaded portion and engaging said end cap holding said contact portion against said end cap and fixing said terminal member to said end cap.

4. A solenoid for electric starting apparatus comprising, a metallic case containing pull-in and hold-in coils, means electrically connecting one lead wire end of said hold-in coil to said case, a cap formed of insulating material secured to an end of said case, a metallic motor terminal and a metallic start switch terminal each supported by and extending through said cap, each terminal having an internal axially extending bore, one lead wire end of said pull-in coil and one lead wire end of said hold-in coil located in said bore of said start switch terminal, the other lead wire end of said pull-in coil located in the bore of said motor terminal, each of said terminals having end portions located externally of the solenoid which are radially crimped into engagement with and welded to the respective lead wire ends positioned in the respective bores.

5. A starter solenoid for an electric starter comprising, metallic housing means containing a hold-in coil and a pull-in coil, said housing means comprising a case and a transversely extending metallic plate secured to said case, a metallic terminal fixed to said plate having an axially extending bore, one lead wire end of said hold-in coil located in said bore with the end of said terminal having a crimped portion of predetermined length that is radially crimped into engagement with said one lead wire end, the end of said crimped portion being welded to the end of said lead wire end, a cap formed of insulating material secured to said housing means carrying a metallic start switch terminal and a metallic motor terminal, means connecting the other lead wire end of said hold-in coil and one lead wire end of said pull-in coil to said start switch terminal, and means connecting the other lead wire end of said pull-in coil to said motor terminal.

* * * * *